(12) United States Patent
Negami et al.

(10) Patent No.: US 11,376,564 B2
(45) Date of Patent: Jul. 5, 2022

(54) CARBON DIOXIDE ADSORBENT AND METHOD FOR MANUFACTURING SAME, AS WELL AS CARBON DIOXIDE SEPARATION SYSTEM

(71) Applicant: KAWASAKI JUKOGYO KABUSHIKI KAISHA, Kobe (JP)

(72) Inventors: Masahiro Negami, Kobe (JP); Takeshi Okumura, Kobe (JP); Ikuo Shimomura, Kobe (JP); Katsuhiro Yoshizawa, Akashi (JP); Yoshimichi Nomura, Kobe (JP); Kazuo Tanaka, Kobe (JP); Shohei Nishibe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 435 days.

(21) Appl. No.: 16/613,055

(22) PCT Filed: Apr. 26, 2018

(86) PCT No.: PCT/JP2018/016929
§ 371 (c)(1),
(2) Date: Nov. 12, 2019

(87) PCT Pub. No.: WO2018/207633
PCT Pub. Date: Nov. 15, 2018

(65) Prior Publication Data
US 2020/0197905 A1 Jun. 25, 2020

(30) Foreign Application Priority Data
May 9, 2017 (JP) .............................. JP2017-092998

(51) Int. Cl.
*B01D 53/08* (2006.01)
*B01J 20/22* (2006.01)
(Continued)

(52) U.S. Cl.
CPC .............. *B01J 20/26* (2013.01); *B01D 53/62* (2013.01); *B01D 53/83* (2013.01); *B01D 53/96* (2013.01);
(Continued)

(58) Field of Classification Search
CPC ........ B01D 53/04; B01D 53/08; B01D 53/62; B01D 53/83; B01D 53/96;
(Continued)

(56) References Cited

U.S. PATENT DOCUMENTS 4,810,266 A * 3/1989 Zinnen .................... B01J 20/20
502/437
7,820,591 B2 * 10/2010 Ryu ...................... B01J 20/3021
423/230
(Continued)

FOREIGN PATENT DOCUMENTS

| JP | H05-161843 A | 6/1993 |
|---|---|---|
| JP | 2012-501831 A | 1/2012 |

(Continued)

*Primary Examiner* — Frank M Lawrence, Jr.
(74) *Attorney, Agent, or Firm* — Oliff PLC

(57) ABSTRACT

A method for manufacturing a carbon dioxide adsorbent includes: forming a kneaded product containing a hydrophilic fiber, a powdery porous material, and an aqueous hydrophilic binder dispersion into particles and drying the particles to generate porous material particles containing the hydrophilic fiber and the powdery porous material combined by the hydrophilic binder; and preparing an aqueous amine solution having an amine concentration of 5% or more and 70% or less and a temperature of 10° C. or higher and 100° C. or lower, impregnating the aqueous amine solution into the porous material particles, and aeration-drying the porous material particles impregnating the amine. The carbon dioxide adsorbent contains the porous material particles and the amine carried by the porous material particles, the porous (Continued)

Base material of Example 1 material particles containing the hydrophilic fiber and the powdery porous material combined by the hydrophilic binder.

10 Claims, 6 Drawing Sheets

(51) Int. Cl.
*B01D 53/62* (2006.01)
*B01J 20/26* (2006.01)
*B01D 53/83* (2006.01)
*B01D 53/96* (2006.01)
*B01J 20/08* (2006.01)
*B01J 20/24* (2006.01)
*B01J 20/28* (2006.01)
*B01J 20/32* (2006.01)
*B01J 20/34* (2006.01)

(52) U.S. Cl.
CPC ............ *B01J 20/08* (2013.01); *B01J 20/22* (2013.01); *B01J 20/24* (2013.01); *B01J 20/2803* (2013.01); *B01J 20/28004* (2013.01); *B01J 20/28028* (2013.01); *B01J 20/3204* (2013.01); *B01J 20/3246* (2013.01); *B01J 20/3293* (2013.01); *B01J 20/3425* (2013.01); *B01J 20/3466* (2013.01); *B01D 2253/104* (2013.01); *B01D 2253/202* (2013.01); *B01D 2253/25* (2013.01); *B01D 2257/504* (2013.01)

(58) Field of Classification Search
CPC ........ B01D 2253/102; B01D 2253/104; B01D 2253/202; B01D 2253/25; B01D 2253/30; B01D 2257/504; B01J 20/08; B01J 20/22; B01J 20/24; B01J 20/26; B01J 20/28004; B01J 20/28028; B01J 20/2803; B01J 20/32; B01J 20/3204; B01J 20/3246; B01J 20/3293; B01J 20/34; B01J 20/3425; B01J 20/3466; Y02C 20/40
USPC ..... 95/110–112, 139, 900–903; 96/123, 145, 96/150, 153; 423/220, 228–230
See application file for complete search history.

(56) References Cited

U.S. PATENT DOCUMENTS

| | | | |
|---|---|---|---|
| 8,598,070 B1* | 12/2013 | Baugh | B01D 53/1493 502/400 |
| 10,603,654 B1* | 3/2020 | Wilfong | B01J 20/043 |
| 2010/0154636 A1 | 6/2010 | Liu et al. | |
| 2011/0293498 A1 | 12/2011 | Lahary et al. | |
| 2012/0076711 A1* | 3/2012 | Gebald | B01J 20/28004 525/437 |
| 2013/0095996 A1 | 4/2013 | Buelow et al. | |
| 2014/0331864 A1 | 11/2014 | Ogino et al. | |
| 2015/0352518 A1* | 12/2015 | Meirav | B01J 20/08 502/401 |
| 2019/0126235 A1 | 5/2019 | Okumura et al. | |

FOREIGN PATENT DOCUMENTS

| | | |
|---|---|---|
| JP | 2012-504050 A | 2/2012 |
| JP | 2013-121562 A | 6/2013 |
| JP | 2014-533195 A | 12/2014 |
| JP | 6055134 B1 | 12/2016 |

* cited by examiner

Base material of Example 1

Base material of Comparative Example 1

CARBON DIOXIDE ADSORBENT AND METHOD FOR MANUFACTURING SAME, AS WELL AS CARBON DIOXIDE SEPARATION SYSTEM

TECHNICAL FIELD

The present invention relates to a carbon dioxide adsorbent for reversibly adsorbing carbon dioxide contained in a gas to be processed and a method for manufacturing the carbon dioxide adsorbent, as well as a system including the carbon dioxide adsorbent.

BACKGROUND ART

Conventionally known is a system for separating, with a solid sorbent, carbon dioxide from a carbon dioxide-containing gas to be processed such as a process gas that is discharged from a combustion facility such as a boiler. PTLS 1 and 2 each disclose this kind of carbon dioxide separation system.

A carbon dioxide separation system disclosed in PTL 1 includes a container accommodating a carbon dioxide adsorbent, and allows the carbon dioxide adsorbent to reversibly adsorb carbon dioxide from a gas to be processed that is introduced into the container. This carbon dioxide adsorbent contains an amine, a carbon dioxide activating catalyst, and a porous substance supporting the amine and the catalyst.

The system of PTL 1 performs processing according to a "batch processing method" that repeats one processing cycle including an "adsorbing step" for adsorbing and removing carbon dioxide from the gas to be processed by the carbon dioxide adsorbent and a "desorbing step" for desorbing the adsorbed carbon dioxide from the carbon dioxide adsorbent. On the other hand, a system of PTL 2 described below performs processing according to a "continuous processing method" that continuously performs the adsorbing step and the desorbing step in parallel.

The carbon dioxide separation system disclosed in PTL 2 includes a hopper, an adsorption tower for performing the adsorbing step, a desorption tower (recovery tower) for performing the desorbing step, a drying tower for drying the adsorbent, and a cooling tower for cooling the adsorbent sequentially arranged downward in a vertical direction, and includes a conveyer for transferring the adsorbent from the cooling tower to the hopper. The carbon dioxide adsorbent accommodated in the hopper moves under its own weight in the order of adsorption tower, the desorption tower, the drying tower, and the cooling tower, and is transported from the cooling tower into the hopper by the conveyer.

In the adsorption tower and the desorption tower, a moving bed is formed by the carbon dioxide adsorbent moving downward in the tower and a gas moving upward in the processing tower. In the system of PTL 2, the carbon dioxide adsorbent is a porous substance impregnating an amine, and exemplified as the porous substance are active carbon and active alumina.

CITATION LIST

Patent Literatures

PTL 1: Japanese Unexamined Patent Application Publication (Translation of PCT Application) No. 2012-501831
PTL 2: Japanese Unexamined Patent Application Publication No. 2013-121562

SUMMARY OF INVENTION

Technical Problems

In the system according to the batch processing method of PTL 1, the carbon dioxide adsorbent remains still with respect to the container. On the other hand, in the system according to the continuous processing method of PTL 2, the carbon dioxide adsorbent moves with respect to the container and thus causes friction and collision between the carbon dioxide adsorbent and the container and between particles of the carbon dioxide adsorbent. Therefore, particularly in the continuous processing method, the carbon dioxide adsorbent is required to have higher strength (particularly abrasion resistance) than the carbon dioxide adsorbent used in the batch processing method.

Further, in the carbon dioxide separation systems described above, the carbon dioxide adsorbent that has a higher carbon dioxide absorption rate is more desirable in order to increase the processing amount per hour.

The present invention has been made in view of the circumstances described above, and an object of the present invention is to provide a carbon dioxide adsorbent that has not only excellent carbon dioxide absorption performance but also abrasion strength allowing for the usage in the continuous processing method and that has an improved carbon dioxide absorption rate compared to a conventional carbon dioxide adsorbent, and to provide a method for manufacturing the carbon dioxide adsorbent, as well as a system including a carbon dioxide adsorbent.

Solutions to Problems

A carbon dioxide adsorbent according to one aspect of the present invention contains porous material particles and an amine carried by the porous material particles, the porous material particles containing a hydrophilic fiber and a powdery porous material combined by a hydrophilic binder.

The carbon dioxide adsorbent may have an average particle size of 1 mm or more and 5 mm or less.

A carbon dioxide separation system according to one aspect of the present invention includes: an adsorption vessel that includes in an interior thereof a moving bed formed by the carbon dioxide adsorbent; and a desorption vessel that includes in an interior thereof a moving bed formed by the carbon dioxide adsorbent having passed through the adsorption vessel, the adsorption vessel including in a lower portion thereof a gas-to-be-processed supply port for receiving a supply of a gas to be processed containing carbon dioxide; and the adsorption vessel including in an upper portion thereof an off-gas discharge port for discharging an off gas obtained through adsorption and removal of the carbon dioxide from the gas to be processed by the carbon dioxide adsorbent, and the desorption vessel including in a lower portion thereof a steam feed port for receiving a supply of a steam for desorption; and the desorption vessel including in an upper portion thereof a carbon dioxide recovery port for discharging the carbon dioxide desorbed from the carbon dioxide adsorbent.

The carbon dioxide adsorbent has abrasion strength allowing for the usage in the continuous processing method such as the carbon dioxide separation system described above, and has not only good carbon dioxide absorption performance but also a higher carbon dioxide absorption rate than an alumina sintered body conventionally used as the carbon dioxide adsorbent.

A method for manufacturing a carbon dioxide adsorbent according to one aspect of the present invention includes: forming a kneaded product containing a hydrophilic fiber, a powdery porous material, and an aqueous hydrophilic binder dispersion into particles and drying the particles to generate porous material particles containing the hydrophilic fiber and the powdery porous material combined by the hydrophilic binder; and preparing an aqueous amine solution having an amine concentration of 5% or more and 70% or less and a temperature of 10° C. or higher and 100° C. or lower, impregnating the porous material particles with the aqueous amine solution, and aeration-drying the porous material particles impregnating the amine.

According to the method for manufacturing a carbon dioxide adsorbent, it is possible to manufacture a carbon dioxide adsorbent having the characteristics described above.

In the method for manufacturing a carbon dioxide adsorbent, the porous material particles may have an average particle size of 1 mm or more and 5 mm or less.

In the method for manufacturing a carbon dioxide adsorbent, the porous material particles have a first peak between 10 nm or more and less than 200 nm and a second peak between 0.2 μm or more and 10 μm or less in a Log differential pore volume distribution.

In the carbon dioxide adsorbent and the method for manufacturing the carbon dioxide adsorbent, the powdery porous material may be at least one powder that is selected from silica, alumina, zeolite, active carbon, or a metal-organic frameworks and that has an average particle size of 1 μm or more and 200 μm or less.

In the carbon dioxide adsorbent and the method for manufacturing the carbon dioxide adsorbent, the amine may be at least one member selected from amines having at least one hydroxyl group or polyamines.

Advantageous Effects of Invention

According to the present invention, it is possible to provide a carbon dioxide adsorbent that has strength allowing for the usage in the continuous processing method and has an improved carbon dioxide absorption rate compared to a conventional carbon dioxide adsorbent, and to provide a method for manufacturing the carbon dioxide adsorbent, as well as a system including a carbon dioxide adsorbent.

DESCRIPTION OF EMBODIMENTS

A carbon dioxide adsorbent (hereinafter, sometimes simply referred to as an "adsorbent") according to the present invention is utilized for reversibly adsorbing and removing carbon dioxide from a gas to be processed containing carbon dioxide. This adsorbent has an excellent carbon dioxide adsorption ability and abrasion resistance and is thus suitable for utilization in a system for adsorbing and removing carbon dioxide from a gas to be processed under the continuous processing method.

[Carbon Dioxide Separation System]

Figure 1:
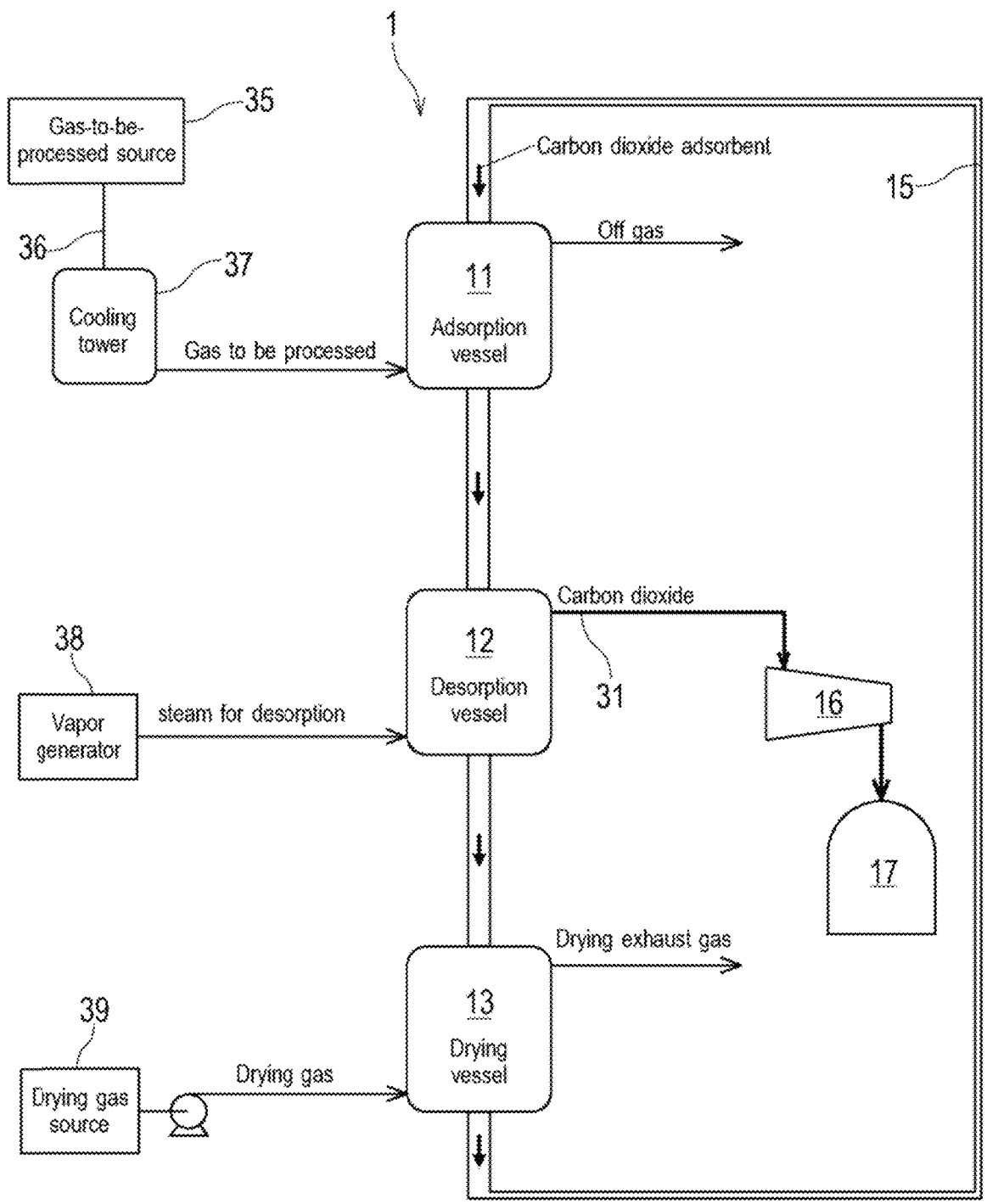
FIG. 1 is a diagram showing a schematic configuration of a moving-bed carbon dioxide separation system where a carbon dioxide adsorbent according to one embodiment of the present invention can be used.

FIG. 1 shows a schematic configuration of a moving-bed carbon dioxide separation system 1 where a carbon dioxide adsorbent can be used.

The moving-bed carbon dioxide separation system 1 shown in FIG. 1 includes an adsorption vessel 11, a desorption vessel 12, and a drying vessel 13 together with a conveyer 15 for transporting an adsorbent from an exit port of the drying vessel 13 to an inlet port of the adsorption vessel 11. For allowing the adsorbent to gravitationally move from the adsorption vessel 11 to the drying vessel 13, the adsorption vessel 11, the desorption vessel 12, and the drying vessel 13 are disposed in this order for vertical arrangement.

The adsorbent transported by the conveyer 15 is supplied to the adsorption vessel 11 through the inlet port provided in an upper portion of the adsorption vessel at a predetermined supply rate. The adsorbent is discharged through an exit port provided in a lower portion of the adsorption vessel 11 at a predetermined discharge rate.

A gas to be processed that is generated in a gas-to-be-processed source 35 is introduced to the lower portion of the adsorption vessel 11 through a gas-to-be-processed supply pipe 36. The gas to be processed is, for example, a nearly-ordinary-pressure gas containing 10 to 30% of carbon dioxide, such as a combustion exhaust gas. The gas-to-be-processed supply pipe 36 may be provided with at least one preprocessing vessel 37. The preprocessing vessel 37 cools the gas to be processed to a temperature appropriate for allowing the gas to be processed to undergo an adsorption reaction of carbon dioxide. The gas to be processed that is introduced into the adsorption vessel 11 may be subjected to, in addition to the cooling, preprocessing such as desulfurization, dedusting, temperature decrease, or dehumidification.

In the adsorption vessel 11, a moving bed is formed in which the upward-flowing gas to be processed comes into contact with the downward-moving adsorbent. The adsorbent that has come into contact with the gas to be processed selectively adsorbs carbon dioxide contained in the gas to be processed. The temperature of the adsorbent in the adsorption is, for example, 40° C. The gas to be processed from which carbon dioxide has been separated and removed (off gas) is discharged from the upper portion of the adsorption vessel 11. On the other hand, the adsorbent that has adsorbed carbon dioxide is discharged from the lower portion of the adsorption vessel 11 and moves under its own weight to an inlet port of the desorption vessel 12.

In the desorption vessel 12, the adsorbent that has adsorbed carbon dioxide is supplied through the inlet port provided in an upper portion of the desorption vessel and the adsorbent is discharged through an exit port provided in a lower portion of the desorption vessel at a predetermined discharge rate, thus moving in the vessel from the top toward the bottom at a predetermined rate. In addition, the desorption vessel 12 receives in the lower portion thereof a supply of steam for desorption fed from a vapor generator 38.

In the desorption vessel 12, a moving bed is formed in which the upward-flowing steam for desorption comes into contact with the downward-moving adsorbent. The contact between the steam for desorption and the adsorbent causes the steam for desorption to be condensed on a surface of the adsorbent and thus emit condensation heat in the condensation. Using the condensation heat as desorbment energy, carbon dioxide is desorbed from the adsorbent.

The desorption vessel 12 is, in the upper portion thereof, connected to a carbon dioxide holder 17 via a carbon dioxide recovery pipe 31. The carbon dioxide recovery pipe 31 is provided with a pump 16 for sending a gas in the desorption vessel 12 out to the carbon dioxide holder 17. The gas (that is, carbon dioxide) in the desorption vessel 12 is forcibly discharged into the carbon dioxide recovery pipe 31, is compressed by the pump 16, and is stored in the carbon dioxide holder 17. On the other hand, the adsorbent containing condensed water as a result of the desorption of carbon dioxide is discharged from the lower portion of the desorption vessel 12 and moves under its own weight to an inlet port of the drying vessel 13.

In the drying vessel 13, the adsorbent containing the condensed water is supplied through the inlet port provided in an upper portion of the drying vessel and the adsorbent is discharged through the exit port provided in a lower portion of the drying vessel at a predetermined discharge rate, thus moving in the vessel from the top toward the bottom at a predetermined rate. The adsorbent is dried as it moves in the drying vessel 13. In the present embodiment, the adsorbent is dried by contact between a drying gas that is supplied from a drying gas source 39 to a lower portion of the drying vessel 13 and flows upward in the vessel and the adsorbent moving downward in the vessel.

The drying gas (drying exhaust gas) used for drying the adsorbent is discharged from the upper portion of the drying vessel 13.

The adsorbent that has been dried is discharged from the lower portion of the drying vessel 13, drops onto the conveyer 15, is transferred to the adsorption vessel 11 by the conveyer 15 while being cooled, and is reused as the adsorbent for carbon dioxide.

[Carbon Dioxide Adsorbent]

The adsorbent used in the carbon dioxide separation system 1 contains porous material particles as a base material and an amine carried by the base material, the porous material particles containing a hydrophilic fiber and a powdery porous material combined by a hydrophilic binder.

<Amine>

The amine is at least one member selected from the group consisting of amines having at least one hydroxyl group and polyamines. That is, the amine may contain a mixture of an amine and a polyamine. These amines and polyamines are known to reversibly desorb carbon dioxide, in other words, to adsorb and desorb carbon dioxide.

Examples of the amine containing an amine having at least one hydroxyl group include monoethanolamine, diethanolamine, and triethanolamine. Examples of the amine containing a polyamine include polyethyleneimine, ethylenediamine, diethylenetriamine, triethylenetetramine, tetraethylenepentamine, and pentaethylenehexamine.

<Hydrophilic Fiber>

The hydrophilic fiber improves strength of the adsorbent according to the present invention and forms a skeleton of the adsorbent.

Examples of the hydrophilic fiber include a cellulose-based fiber formed of cellulose or a cellulose derivative, a polyvinyl alcohol-based fiber, and a polyamide-based fiber. Specific examples of the cellulose include wood pulp, used paper pulp, cotton, hemp, and rayon. Specific examples of the cellulose derivative include cellulose acetate and carboxymethyl cellulose. Specific examples of the polyvinyl alcohol-based fiber include polyvinyl alcohol and polyvinyl formal. Specific examples of the polyamide-based fiber include 6-nylon and 6,6-nylon.

The hydrophilic fiber may have a fiber length of 0.1 to 10 mm. The hydrophilic fiber may have a fiber diameter of 1.0 to 20 μm. The content of the hydrophilic fiber may be 5% by mass or more and 50% by mass or less relative to the total mass of the porous material particles. The content of the hydrophilic fiber, however, is to be determined in consideration of the balance with the content of the hydrophilic binder while prioritizing the content of the powdery porous material.

<Powdery Porous Material>

The powdery porous material is at least one member selected from the group consisting of silica such as silica gel and mesoporous silica; alumina such as active alumina; zeolite; active carbon; and a metal-organic frameworks (MOF). The content of the powdery porous material may be 30% by mass or more and 85% by mass or less relative to the total mass of the porous material particles.

The powdery porous material has an average particle size of 1 μm or more and 200 μm or less, preferably 5 μm or more and 150 μm or less. The powdery porous material having an average particle size of more than 200 μm has trouble being uniformly scattered in the porous material particles in association with the hydrophilic fiber. On the other hand, the powdery porous material having an average particle size of less than 1 μm makes the porous material particles have a smaller pore diameter than a required value.

For determining the average particle size of the powdery porous material, a suspension has been prepared that has an appropriate concentration of a powdery porous material sample, with heptane used as a disperse medium, and the suspension has been subjected to particle size distribution measurement with a laser diffraction particle size analyzer according to a wet method. The obtained particle size distribution has been formed into a volume-based cumulative distribution starting from a smaller particle size, and the particle size at a cumulative volume of 50% has been defined as the average particle size (that is, volume average particle size (D50 v)).

<Hydrophilic Binder>

The hydrophilic binder has hydrophilicity and firmly bonds the hydrophilic fiber to the powdery porous material.

The hydrophilic binder has water-insolubility so as not to allow the porous material particles to be eluted into an aqueous amine solution when the porous material particles are impregnated with the aqueous amine solution in a process of manufacturing the adsorbent described later. The hydrophilic binder having "hydrophilicity" means that 1 g or more of the binder is dissolved in 100 g of 20° C. water. The content of the hydrophilic binder may be 0.5 to 30% by mass relative to the total mass of the porous material particles.

The hydrophilic binder is one or more selected from those obtained by water-insolubilizing water-soluble polymers such as starch, methyl cellulose, carboxymethyl cellulose, alginic acid, guar gum, gum arabic, agar, carrageenan, polyacrylic acid, polyvinyl alcohol, and polyethylene glycol. The insolubilizing water-soluble polymers refer to water insolubilization by, for example, cross-linkage, salt exchange, introduction of a hydrophobic functional group, or phase transition.

<Porous Material Particles>

The porous material particles as the base material are particles having an average particle size of 1 mm or more and 5 mm or less. It is possible to control the particle size and the shape of the porous material particles in a particle forming step described later.

When the porous material particles have an average particle size of 1 mm or more and 5 mm or less as described above, the carbon dioxide adsorbent containing the porous material particles and the amine carried by the porous material particles also generally has an average particle size of 1 mm or more and 5 mm or less.

The carbon dioxide adsorbent having a particle size of less than 1 mm flows with a small amount of gas not to attain establishment of the moving bed. On the other hand, the carbon dioxide adsorbent having a particle size of more than 5 mm increases weight along with an increase in the particle size of the adsorbent, to cause severe abrasion by the impact when dropped, remarkably shortening the life of the adsorbent. Accordingly, the use of the carbon dioxide adsorbent having a particle size in the range of 1 mm or more and 5 mm or less facilitates formation of the moving bed in which the adsorbent and the gas to be processed suitably attain counter-flow contact, and is capable of giving an appropriate life to the adsorbent.

The "particle size" of the porous material particles and the adsorbent means a particle diameter. It is possible to measure the particle size of the porous material particles and the adsorbent by, for example, the following (1) to (4) steps.

(1) Arrange 100 or more sample porous material particles on black felt while avoiding as practicably as possible contact between particles.

(2) Capture an image of the sample porous material particles in a visual field range of 100 mm×140 mm.

(3) Binarize the captured image using image processing software ImageJ (National Institutes of Health (NIH)) to determine the area of each particle.

(4) Determine the particle size from the determined area of each particle assuming that the porous material particles are spheres.

A number average size (=Σ(particle size)/(number of particles evaluated)) may be determined from the determined particle sizes to use this number average size as the particle size.

[Method for Manufacturing Carbon Dioxide Adsorbent]

A step of manufacturing a carbon dioxide adsorbent roughly includes producing porous material particles as a base material and making the produced porous material particles impregnate an amine.

The producing the porous material particles include the following (1) to (3) procedures.

(1) Knead a hydrophilic fiber, a powdery porous material, and an aqueous hydrophilic binder dispersion liquid at a predetermined weight ratio. Here, an aqueous hydrophilic binder solution may be used in place of the aqueous hydrophilic binder dispersion liquid.

(2) Extrusion-mold the kneaded product into pellets each with a predetermined amount and round the pellets by a granulator to form particulate objects having a predetermine particle size.

(3) Dry the obtained particulate matter in an atmosphere at 130° C. for about 30 minutes to give porous material particles.

The making the porous material particles impregnate the amine includes the following procedures (1) to (3).

(1) prepare an aqueous amine solution having an amine concentration of 5% or more and 70% or less and a temperature of 10° C. or higher and 100° C. or lower.

(2) Impregnate the produced porous material particles with the prepared aqueous amine solution. It is possible to set the impregnation time of the porous material particles at, for example, 24 hours.

(3) Remove an excessive liquid attached to the porous material particles by a method such as suction filtration and then aeration-dry the porous material particles impregnating the amine at a temperature close to room temperature. The above steps are capable of manufacturing a carbon dioxide adsorbent.

The aqueous amine solution is known to lower its viscosity along with an increase of its temperature.

Therefore, in order to make the porous material particles uniformly impregnate the amine, the temperature of the aqueous amine solution is desirably set at 10° C. or higher. On the other hand, the aqueous amine solution having a temperature of higher than 100° C. easily allows the amine to be oxidized or evaporated. Therefore, the aqueous amine solution suitably has a temperature of 10° C. or higher and 100° C. or lower.

The amine concentration of the aqueous amine solution is desirably an appropriate value in the range of 5% or more and 70% or less depending on the amine. For example, when the amine is diethanolamine, the amine concentration of the aqueous amine solution is appropriately 5% or more and 55% or less. For example, when the amine is polyethyleneimine having high viscosity, the amine concentration is preferably around 10%.

The aqueous amine solution having an amine concentration of less than the lower limit value does not allow the porous material particles to impregnate a sufficient amount of the amine and also produces a huge drainage amount after the processing of making the porous material particles impregnate the amine. On the other hand, the aqueous amine solution having an amine concentration of more than the upper limit value allows the amine to clog pores of the porous material particles, possibly lowering the adsorption performance of the adsorbent. The aqueous amine solution having an amine concentration in the range of 5 to 70% allows the porous material particles to increase its amine impregnating amount along with an increase in the amine concentration and also allows the adsorbent to proportionally increase its specific weight and carbon dioxide adsorption amount. Thus, appropriately setting the amine concentration of the aqueous amine solution in the range of 5% or more and 70% or less enables manufacturing of a carbon dioxide adsorbent in accordance with a design specification of the adsorbent.

EXAMPLES

Hereinafter, a carbon dioxide adsorbent according to the present invention is evaluated with reference to specific examples and comparative examples. Following Table 1 shows compositions of carbon dioxide adsorbents according to Example 1 and Comparative Examples 1 and 2.

TABLE 1

|  | Example 1 | Comparative Example 1 | Comparative Example 2 |
|---|---|---|---|
| Base material | Porous material particles (active alumina powder + cellulose fiber + polyvinyl alcohol) | Alumina sintered body | Silica gel |
| Amine | Diethanolamine | Diethanolamine | Diethanolamine |

Example 1

First, porous material particles as a base material were produced by the following procedures (1) to (3).

(1) Knead by a kneader a powdery porous material, a hydrophilic fiber, and an aqueous hydrophilic binder solution each having predetermined parts by weight. Here, used as the powdery porous material was an active alumina fine powder (average particle size: 50 μm or less, VGL-15 manufactured by UNION SHOWA K.K.), used as the hydrophilic fiber was chemical pulp (CP) having an average fiber length of about 3 mm and a fiber diameter of about 10 μm, and used as the hydrophilic binder was polyvinyl alcohol. The powdery porous material was set at 72% by mass of the total mass of the porous material particles, and the total of the hydrophilic fiber and the hydrophilic binder was set at 28% by mass of the total mass of the porous material particles.

(2) Extrusion-mold the kneaded product into pellets by an extruder and further form the pellets into spherical particles by a granulator.

(3) Dry the obtained particulate matter in an atmosphere at 130° C. for 30 minutes.

The base material (porous material particles) obtained by the above procedures had a particle size of 3 mm.

Next, the base material was made to impregnate the amine by the following procedures (1) to (5).

(1) Collect about 300 mL of the base material and measure its weight (W).

(2) Dilute a drug (amine) into a predetermined concentration (%) of a solution for making the porous material particles impregnate the amine and put the solution into a bottle. Here, used as the drug was diethanolamine and the concentration of the solution making the porous material particles impregnate the amine was set at 40%.

(3) Put the base material of (1) into the bottle of (2) and leave the bottle at room temperature for 8 hours or more. Here, the weight ratio between the base material and the drug was set at 1:3.

(4) Extract the base material from (3) and subject it to centrifugal separation (1100 rpm).

(5) Charge the base material impregnating the drug into a container and aeration-dry it under a flow of a drying gas (nitrogen gas with 40° C. at 15 L/min). The completion condition for drying the base material impregnating the drug (that is, a carbon dioxide adsorbent) was an elapse of 2 hours after stabilization of the gas temperature at an exit port of a drying vessel for drying the base material impregnating the drug.

The above procedures gave a carbon dioxide adsorbent sample.

Example 2

Porous material particles as a base material were produced in the same procedures as in Example 1. The base material (porous material particles) of Example 2, however, had a particle size of 1.7 mm. Then, this base material was made to impregnate the amine in the same procedures as in Example 1 to give a carbon dioxide adsorbent sample.

Comparative Example 1

An active alumina powder (average particle size: 50 μm or less, VGL-15 from UNION SHOWA K.K.) was sintered to give an alumina sintered body as a base material, and the base material was made to impregnate the amine in the same procedures as in Example 1 to give a carbon dioxide adsorbent sample.

Comparative Example 2

With silica gel (average particle size: 2.7 mm, average pore diameter 30 CARiACT Q-30 from FUJI SILYSIA CHEMICAL LTD.) used as a base material, the base material was made to impregnate the amine in the same procedures as in Example 1 to give a carbon dioxide adsorbent sample.

[Structural Comparison Between Base Materials of Adsorbents]

Figure 2:
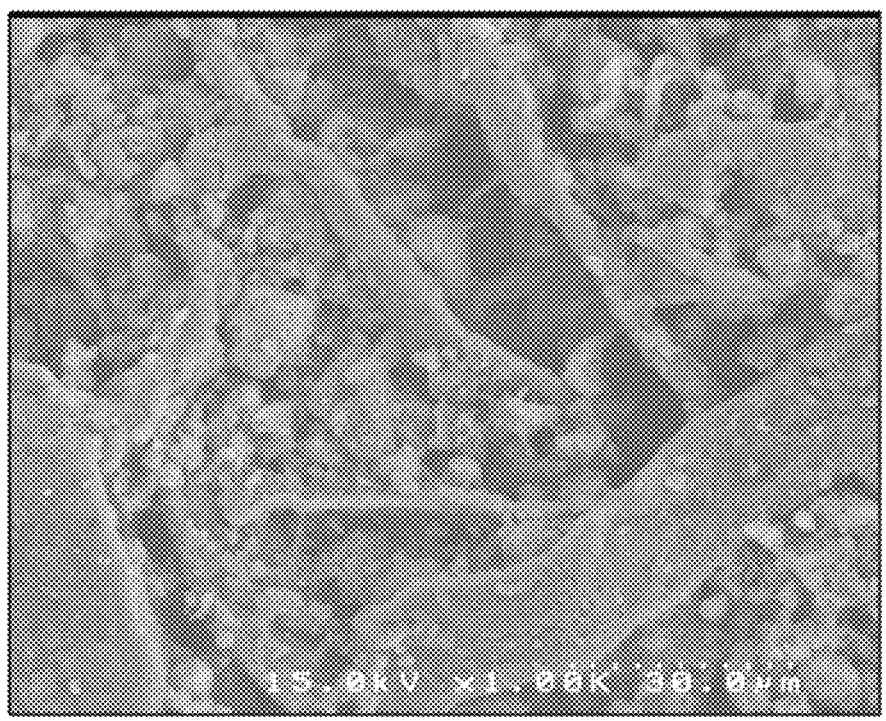
FIG. 2 is an SEM photograph showing a surface of a base material of Example 1.
Figure 3:
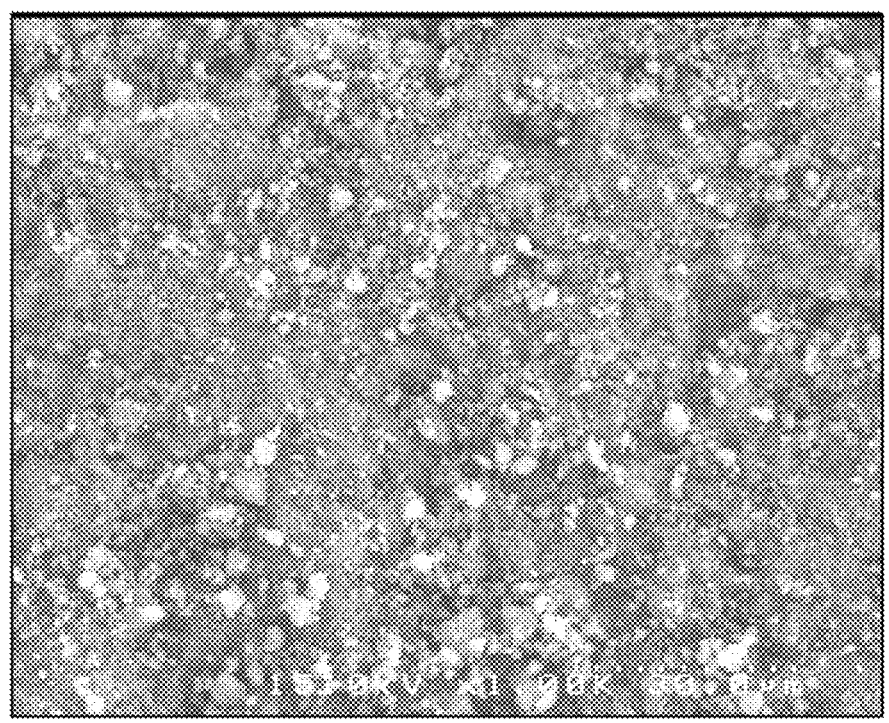
FIG. 3 is an SEM photograph showing a surface of a base material of Comparative Example 1.

FIG. 2 is an SEM photograph showing a surface of the base material of Example 1, and FIG. 3 is an SEM photograph showing a surface of the base material of Comparative Example 1. The base materials of Example 1 and Comparative Example 1 were structurally compared using these photographs.

In the base material (that is, the porous material particles) of Example 1, the hydrophilic fiber forms a skeleton, the powdery porous material enters into gaps of the skeleton, and the hydrophilic fiber and the powdery porous material are bonded with the hydrophilic binder while intricately intertwined. That is, the base material of Example 1 contains the hydrophilic fiber and the powdery porous material combined with each other. Further, in the base material of Example 1, the intertwined hydrophilic fiber forms a pore having a larger diameter than a pore formed only by the powdery porous material. From a pore volume measurement result, this pore is supposed to be communicated with an inner portion of the base material.

On the other hand, in the base material (that is, the alumina sintered body) of Comparative Example 1, particles of the alumina powder are melted to be bonded, so that the base material has a relatively smooth surface on which is observed a pore derived from a gap between particles of the alumina powder.

The diameter of the pore on the surface of the base material of Comparative Example 1, however, is remarkably smaller than the diameter of the pore on the surface of the base material of Example 1.

[Comparison of Pore Diameter Distributions]

The average pore diameter of the base material in the adsorbent significantly affects the adsorption rate of the adsorbent.

The adsorption rate of the adsorbent depends on a carbon dioxide in-pore diffusion rate and an adsorption reaction rate of the adsorbent. The adsorption reaction rate of these two factors is sufficiently high compared to the carbon dioxide in-pore diffusion rate, so that the adsorption rate of the adsorbent is actually limited by the carbon dioxide in-pore diffusion rate.

Figure 4:
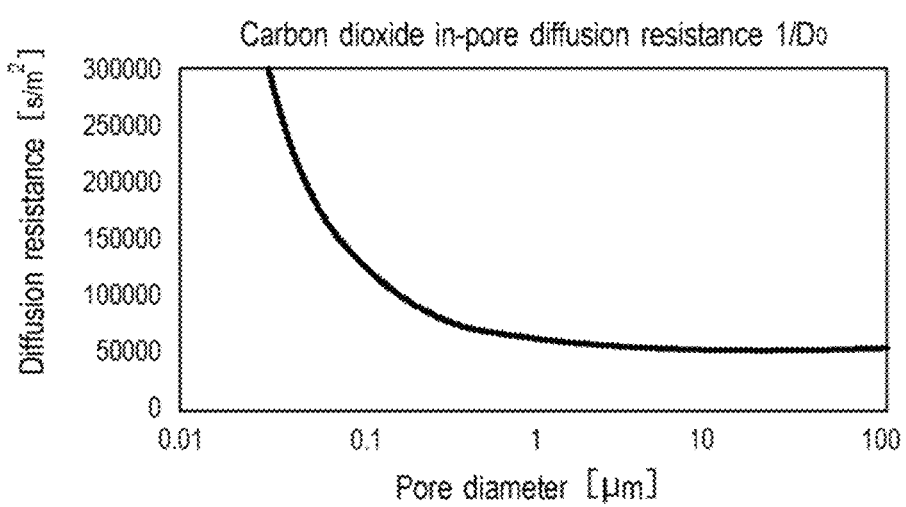
FIG. 4 is a graph showing a relationship between a pore diameter of a carbon dioxide adsorbent and carbon dioxide in-pore diffusion resistance.

FIG. 4 is a graph showing a relationship between a pore diameter of a carbon dioxide adsorbent and carbon dioxide in-pore diffusion resistance. The carbon dioxide in-pore diffusion resistance shown in FIG. 4 exponentially decreases along with an increase of the pore diameter, and the carbon dioxide in-pore diffusion resistance gives a large change with a pore diameter being a value smaller than 0.2 µm, whereas the carbon dioxide in-pore diffusion resistance gives a small change with the pore diameter being around more than 0.2 µm.

Figure 5:
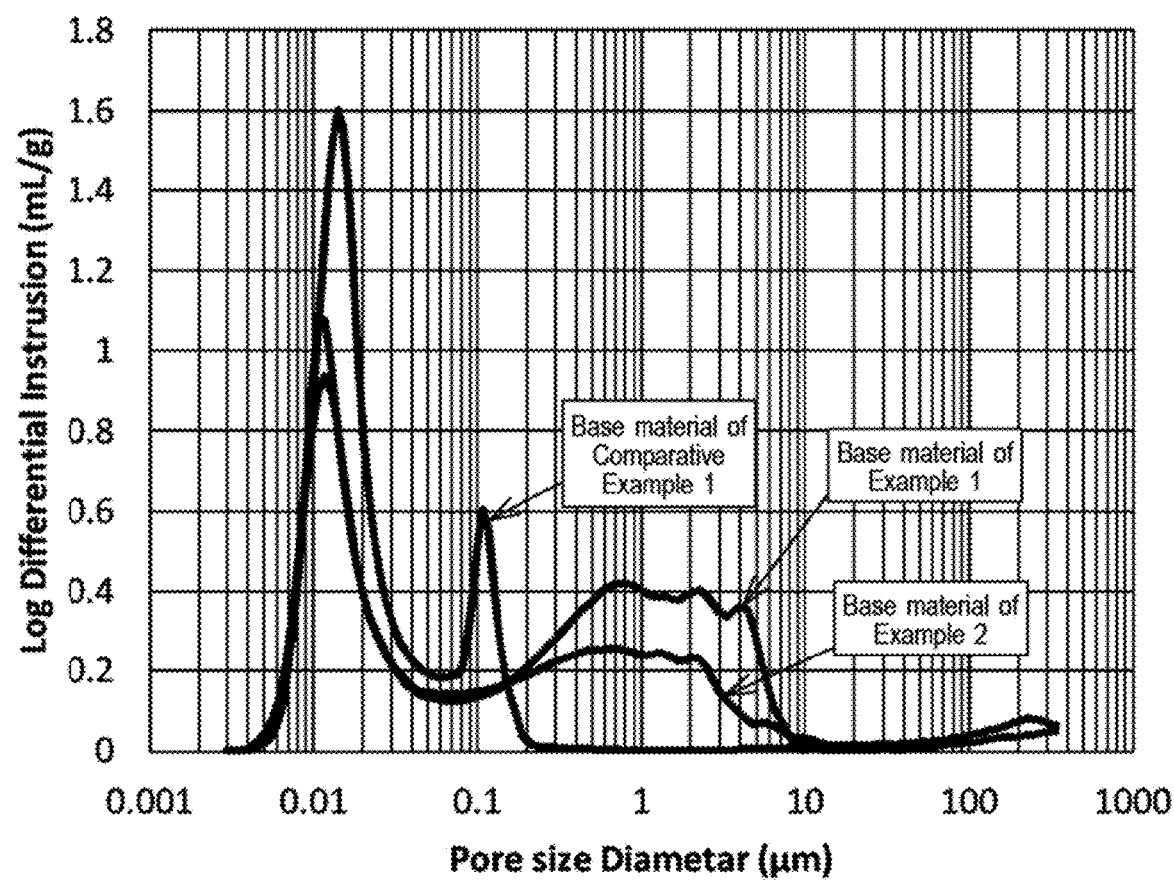
FIG. 5 is a graph showing measurement results of Log differential pore volume distributions for base materials of Examples 1 and 2 and Comparative Example 1.
Figure 6:
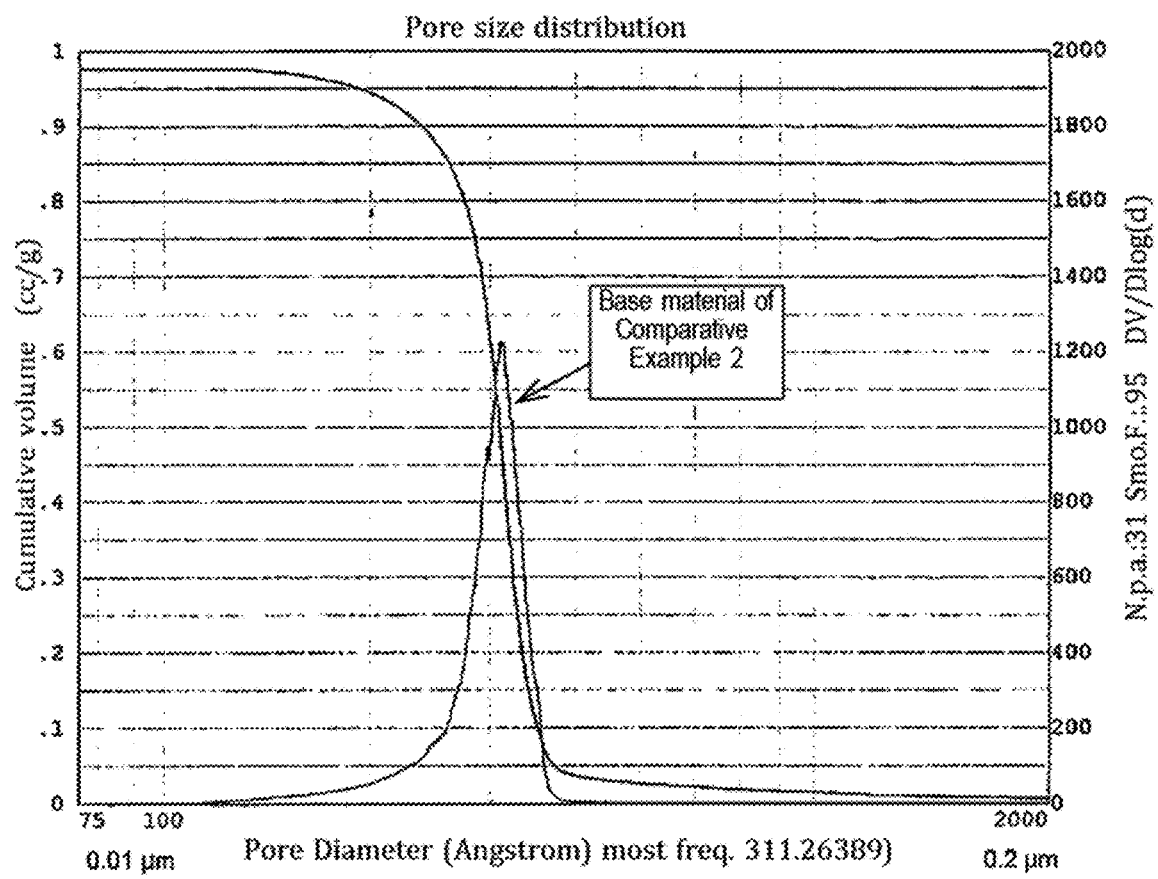
FIG. 6 is a graph showing a measurement result of a Log differential pore volume distribution for a base material of Comparative Example 2.

FIG. 5 is a graph showing measurement results of Log differential pore volume distributions for the base materials of Examples 1 and 2 and Comparative Example 1. FIG. 6 is a graph showing a measurement result of a Log differential pore volume distribution for the base material of Comparative Example 2.

The Log differential pore volume distribution dV/d(log D) represents values each obtained by dividing a differential pore volume dV by a logarithmic differential value of the pore diameter d(log and plotted in each average-pore-diameter section. The pore diameter distributions of the base materials were obtained by a mercury intrusion method. The mercury intrusion method is a method for putting pressure on mercury, which is utilized for its large surface tension, to force the mercury to intrude into pores of a powdery substance and obtaining a specific surface area or a pore distribution from the pressure applied and the amount of mercury forced to intrude into the pores. The pore diameter distributions of the base materials of Examples 1 and 2 and Comparative Example 1 were measured using a micromeritics pore distribution measuring apparatus (Autopore 9520) manufactured by SHIMADZU CORPORATION. The pore diameter distribution of the base material of Comparative Example 2 was measured using a mercury porosimeter (PASCL240) manufactured by Thermo Qurest Italia. As regards the base materials of Examples 1 and 2, a pore volume value was determined in each of pore-diameter ranges of 10 to 200 [nm] and 0.2 to 10 [µm] on the basis of the Log differential pore volume distribution.

Following Table 2 indicates the pore volume value in each of the pore-diameter ranges for the base materials of Examples 1 and 2.

TABLE 2

| | Pore volume [ml/g] | |
|---|---|---|
| Pore diameter | 10 - 200 [nm] | 0.2 - 10 [µm] |
| Base material of Example 1 | 0.39 | 0.53 |
| Base material of Example 2 | 0.39 | 0.31 |

The Log differential pore volume distribution of the base material (that is, the powdery porous material) of Example 1 shows a first peak in a pore diameter of 10 to 200 nm (0.01 to 0.02 µm) and a second peak in a pore diameter of 0.2 to 10 µm. The second peak is gentler than the first peak.

The Log differential pore volume distribution of the base material (that is, the powdery porous material) of Example 2 shows a first peak in a pore diameter of 10 to 200 nm (0.01 to 0.02 µm) and a second peak in a pore diameter of 0.2 to 10 µm. The second peak is gentler than the first peak.

The second peak appearing in the Log differential pore volume distribution of the base material of Example 2 is considered to derived from pores formed by the hydrophilic fiber intertwined as shown in the SEM photograph of FIG. 2. On the other hand, the first peak appearing in the Log differential pore volume distribution of the base material of Example 2 is considered to derived from pores of the powdery porous material. These pores hold the amine and play a role as a reaction site for adsorbing carbon dioxide.

Here, with the pore diameter of the pores at the first peak being smaller than 10 nm, the gas in-pore diffusion rate remarkably lowers, the pores may possibly be clogged during making the porous material particles impregnate the amine, and further, the carbon dioxide adsorbent is incapable of having sufficient carbon dioxide absorption performance. With the pore diameter of the pores at the first peak being more than 200 nm, the pores have a remarkably small specific surface area to make it difficult to make the porous material particles to impregnate a sufficient amount of the amine.

The Log differential pore volume distribution of the base material (that is, the alumina sintered body) of Comparative Example 1 shows a peak in each of a pore diameter of 10 to 20 nm (0.01 to 0.02 µm) and a pore diameter of 80 to 200 nm (0.08 to 0.2 µm).

The Log differential pore volume distribution of the base material (that is, the silica gel) of Comparative Example 2 shows a single peak in a pore diameter of 30 nm (0.03 µm).

[Comparison of Carbon Dioxide Absorption Amounts]

A carbon dioxide absorption test was performed for the carbon dioxide adsorbent samples of Example 1 and Comparative Examples 1 and 2, and the carbon dioxide absorption amounts of the samples were compared.

The carbon dioxide absorption test (column test) was performed by the following (1) to (4) procedures.

(1) Firmly charge the sample into a 25-mm inner-diameter adsorption vessel to a height of 300 mm.

Here, the charged sample was 147 mL.

(2) Flow an adsorption gas into a bypass line and confirm that the concentration of the gas is 10.0%. Here, the adsorption gas is air containing 10% by volume of carbon dioxide and having a moisture of 5% RH and a temperature of 25° C. The superficial velocity of the adsorption gas is set at 0.05 m/s.

(3) Flow the adsorption gas into the adsorption vessel and measure the gas concentration at an exit port of the adsorption vessel.

(4) Confirm that the gas concentration at the exit port has become 9.0% (that is, saturated adsorption) and finish the adsorption step.

Figure 7:
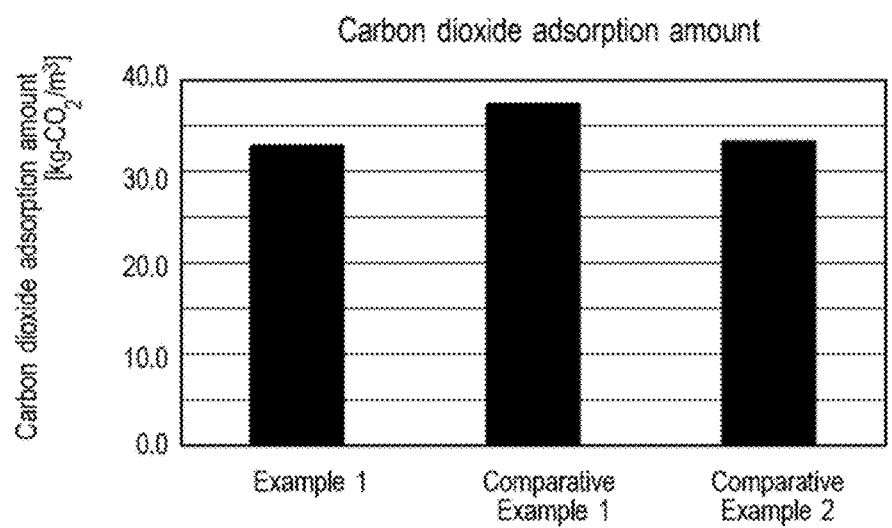
FIG. 7 is a graph showing test results of carbon dioxide absorption amounts of carbon dioxide adsorbents.

FIG. 7 is a graph showing test results of the carbon dioxide absorption amounts. As shown in FIG. 7, the test results of the carbon dioxide absorption amounts illustrate that the carbon dioxide adsorbent of Example 1 gave a carbon dioxide absorption amount of 33.3 kg-$CO_2$/$m^3$, the carbon dioxide adsorbent of Comparative Example 1 gave a carbon dioxide absorption amount of 37.4 kg-$CO_2$/$m^3$, and the carbon dioxide adsorbent of Comparative Example 2 gave a carbon dioxide absorption amount of 33.7 kg-$CO_2$/$m^3$. The carbon dioxide adsorbents of Example 1 and Comparative Examples 1 and 2 did not show a large difference in the carbon dioxide absorption amount. In other words, use of different base materials in the adsorbent hardly made a difference in the carbon dioxide absorption amount.

[Comparison of Carbon Dioxide Absorption Rates]

Using the carbon dioxide absorption test (column test) results of the carbon dioxide adsorbent samples of Example 1 and Comparative Examples 1 and 2, the carbon dioxide absorption rates of the samples were compared.

In a breakthrough curve (test time-carbon dioxide concentration at exit port) obtained by the carbon dioxide absorption test (column test), a time required for the carbon dioxide concentration at the exit port to reach from 1% to 5% after breakthrough was determined, and the reciprocal of the time was defined as the absorption rate. Then, the absorption rates of the samples were relatively compared.

Under an almost identical carbon dioxide absorption amount, the adsorbent having a higher absorption rate has a shorter length of an adsorption zone in the column and gives a shaper rise in the carbon dioxide concentration at the exit port after the breakthrough.

Figure 8:
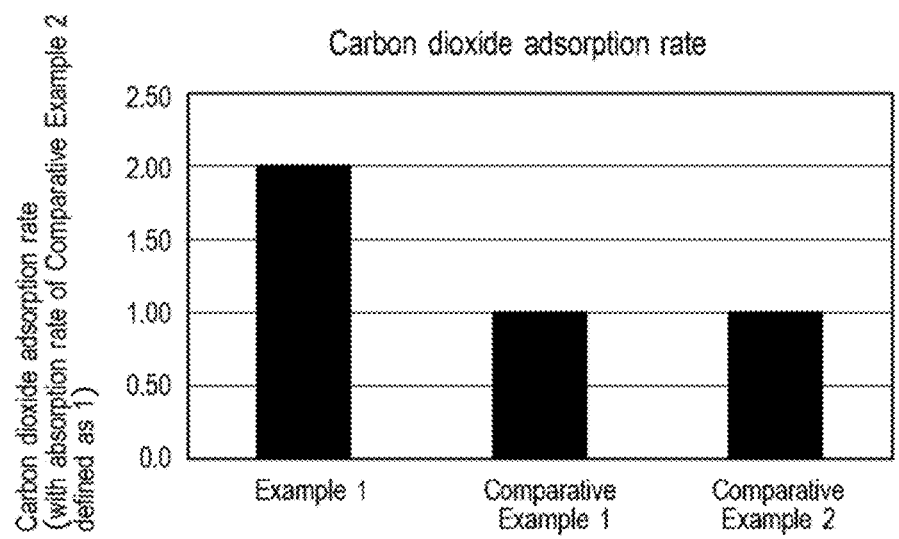
FIG. 8 is a graph showing test results of carbon dioxide absorption rates of the carbon dioxide adsorbents.

FIG. 8 is a graph showing test results of the carbon dioxide absorption rates. This graph relatively illustrates the carbon dioxide absorption rates of the carbon dioxide adsorbents of Example 1 and Comparative Example 1, with the carbon dioxide absorption rate of the carbon dioxide adsorbent of Comparative Example 2 defined as 1. As shown in FIG. 8, the test results of the carbon dioxide absorption rates illustrate that the carbon dioxide adsorbents of Comparative Examples 1 and 2 gave a carbon dioxide absorption rate of 1 and the carbon dioxide adsorbent of Example 1 gave a carbon dioxide absorption rate of 2. In other words, the carbon dioxide adsorbent of Example 1 had a two times higher carbon dioxide absorption rate than the carbon dioxide adsorbents of Comparative Examples 1 and 2.

The test results of the carbon dioxide absorption amounts and the test results of the carbon dioxide absorption rates described above clarified that when the carbon dioxide adsorbent of Example 1 was compared with the carbon dioxide adsorbents of Comparative Examples 1 and 2, they hardly showed a difference in the carbon dioxide absorption amount, but the former adsorbent had a two times higher carbon dioxide absorption rate than the carbon dioxide absorption rates of the latter adsorbents.

One reason for thus greatly improving the carbon dioxide absorption rate of the carbon dioxide adsorbent of Example 1 is supposed to be the existence of the pores having a pore diameter of 0.2 to 10 µm observed in the Log differential pore volume distribution of Example 2 in FIG. 5. The base materials of Examples 1 and 2 have different particle sizes, but their Log differential pore volume distributions are considered to have similar characteristics. As FIG. 4 shows that the carbon dioxide in-pore diffusion resistance is generally low at a pore diameter of 0.2 µm or more, the pores existing in the carbon dioxide adsorbent of Example 1 and having a pore diameter of 0.2 to 10 µm are considered to have small carbon dioxide in-pore diffusion resistance to allow carbon dioxide to rapidly diffuse into the pores, resulting in increasing the carbon dioxide absorption rate. On the other hand, as clarified by the Log differential pore volume distributions of Comparative Examples 1 and 2 in FIGS. 5 and 6, the carbon dioxide adsorbents of Comparative Examples 1 and 2 include pores most of which have a pore diameter of less than 0.2 µm. This fact is considered to increase the carbon dioxide in-pore diffusion resistance and reduce the carbon dioxide in-pore diffusion rate.

[Evaluation of Rotation Abrasion Strength]

A rotation abrasion test was performed for the base materials of Example 1 and Comparative Example 1.

The rotation abrasion test was performed by the following (1) and (2) procedures.

(1) The base material in an amount of 245 ml was put in a single partition wall-equipped cylindrical drum, and the drum was rotated at 60 rpm for 48 hr.

(2) A powdering rate was calculated from a change in weight of the base material between before and after the procedure (1).

Details of the test procedures other than described above were compliant with JIS K1150; 1994 "5.9 particle strength- 5.9.1 case of spalled particles having a particle size of 1.4 mm or more as a lower limit of particle size distribution."

Figure 9:
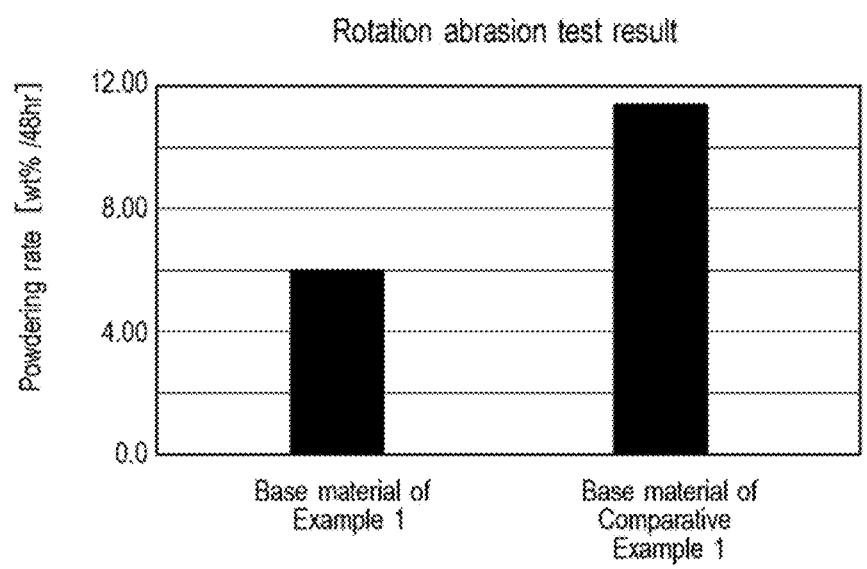
FIG. 9 is a graph showing rotation abrasion test results of the base materials.

FIG. 9 is a graph showing rotation abrasion test results of the base materials of the adsorbents. As shown in FIG. 9, the base material (that is, the porous material particles) of Example 1 had a powdering rate of 6.0 wt %/48 h. On the other hand, the base material (that is, the alumina sintered body) of Comparative Example 1 had a powdering rate of 11.5 wt %/48 h. When the powdering rate is used as a criterion, it is possible to evaluate the base material of Example 1 as having approximately 2 times higher rotation abrasion strength than the base material of Comparative Example 1.

A reason why the base material of Example 1 has high rotation abrasion strength as described above is considered to be that the hydrophilic fiber increases the structural strength of the adsorbent, resulting in allowing the base material to have high abrasion strength.

When a carbon dioxide adsorbent is produced using a sample having a powdering rate of 7 wt % or less in the rotation abrasion test, the carbon dioxide adsorbent is empirically recognized as being strong enough for the usage in the carbon dioxide separation system 1 according to the continuous processing method that includes the moving bed in its apparatus. Therefore, it was determined that the carbon dioxide adsorbent containing, as the base material, a sample having a powdering rate of 7 wt % or less was evaluated as having abrasion resistance allowing for the usage in the carbon dioxide separation system according to the continuous processing method.

On the basis of the evaluation criterion, it is possible to evaluate a carbon dioxide adsorbent containing the base material of Example 1 as having abrasion resistance allowing for the usage in the carbon dioxide separation system according to the continuous processing method. That is, the carbon dioxide adsorbent of Example 1 naturally has abrasion resistance strength allowing for the utilization of itself as the carbon dioxide adsorbent that forms the moving bed in the carbon dioxide separation system 1.

As described above, the carbon dioxide adsorbent according to the present invention clarified that it has not only carbon dioxide adsorption performance equal to the alumina sintered body and the silica gel conventionally used as the carbon dioxide adsorbents but also an improved carbon dioxide absorption rate together with abrasion strength high enough for the usage in the carbon dioxide separation system 1 according to the continuous processing method.

The invention claimed is:

1. A carbon dioxide adsorbent comprising porous material particles and an amine carried by the porous material particles, the porous material particles containing a hydrophilic fiber and a powdery porous material combined by a hydrophilic binder.

2. The carbon dioxide adsorbent according to claim 1, wherein
    the powdery porous material is at least one member selected from the group consisting of silica, alumina, zeolite, active carbon, and metal-organic frameworks.

3. The carbon dioxide adsorbent according to claim 1, wherein
    the amine is at least one member selected from the group consisting of amines having at least one hydroxyl group and polyamines.

4. The carbon dioxide adsorbent according to claim 1, having an average particle size of 1 mm or more and 5 mm or less.

5. A method for manufacturing a carbon dioxide adsorbent, the method comprising:

forming a kneaded product containing a hydrophilic fiber, a powdery porous material, and an aqueous hydrophilic binder dispersion into particles and drying the particles to generate porous material particles containing the hydrophilic fiber and the powdery porous material combined by the hydrophilic binder; and preparing an aqueous amine solution having an amine concentration of 5% or more and 70% or less and a temperature of 10° C. or higher and 100° C. or lower, impregnating aqueous amine solution into the porous material particles, and aeration-drying the porous material particles impregnating the amine.

6. The method for manufacturing a carbon dioxide adsorbent according to claim 5, wherein the porous material particles have an average particle size of 1 mm or more and 5 mm or less.

7. The method for manufacturing a carbon dioxide adsorbent according to claim 5, wherein the powdery porous material is at least one powder that is selected from the group consisting of silica, alumina, zeolite, active carbon, and metal-organic frameworks and that has an average particle size of 1 μm or more and 200 μm or less.

8. The method for manufacturing a carbon dioxide adsorbent according to claim 5, wherein the amine is at least one member selected from the group consisting of amines having at least one hydroxyl group and polyamines.

9. The method for manufacturing a carbon dioxide adsorbent according to claim 5, wherein the porous material particles have a first peak between 10 nm or more and less than 200 nm and a second peak between 0.2 μm or more and 10 μm or less in a Log differential pore volume distribution.

10. A carbon dioxide separation system comprising:

an adsorption vessel that includes in an interior thereof a moving bed formed by the carbon dioxide adsorbent according to claim 1, and a desorption vessel that includes in an interior thereof a moving bed formed by the carbon dioxide adsorbent having passed through the adsorption vessel, the adsorption vessel including in a lower portion thereof a gas-to-be-processed supply port for receiving a supply of a gas to be processed containing carbon dioxide; and the adsorption vessel including in an upper portion thereof an off-gas discharge port for discharging an off gas obtained through adsorption and removal of the carbon dioxide from the gas to be processed by the carbon dioxide adsorbent, and the desorption vessel including in a lower portion thereof a steam feed port for receiving a supply of a steam for desorption; and the desorption vessel including in an upper portion thereof a carbon dioxide recovery port for discharging the carbon dioxide desorbed from the carbon dioxide adsorbent.

* * * * *